Dec. 24, 1935.  O. F. LUNDELIUS ET AL  2,025,668
VEHICLE DIFFERENTIAL MOUNTING
Filed Aug. 7, 1933  3 Sheets-Sheet 1

Inventors
Oscar F. Lundelius.
Melvin N. Lefler.

Attorney

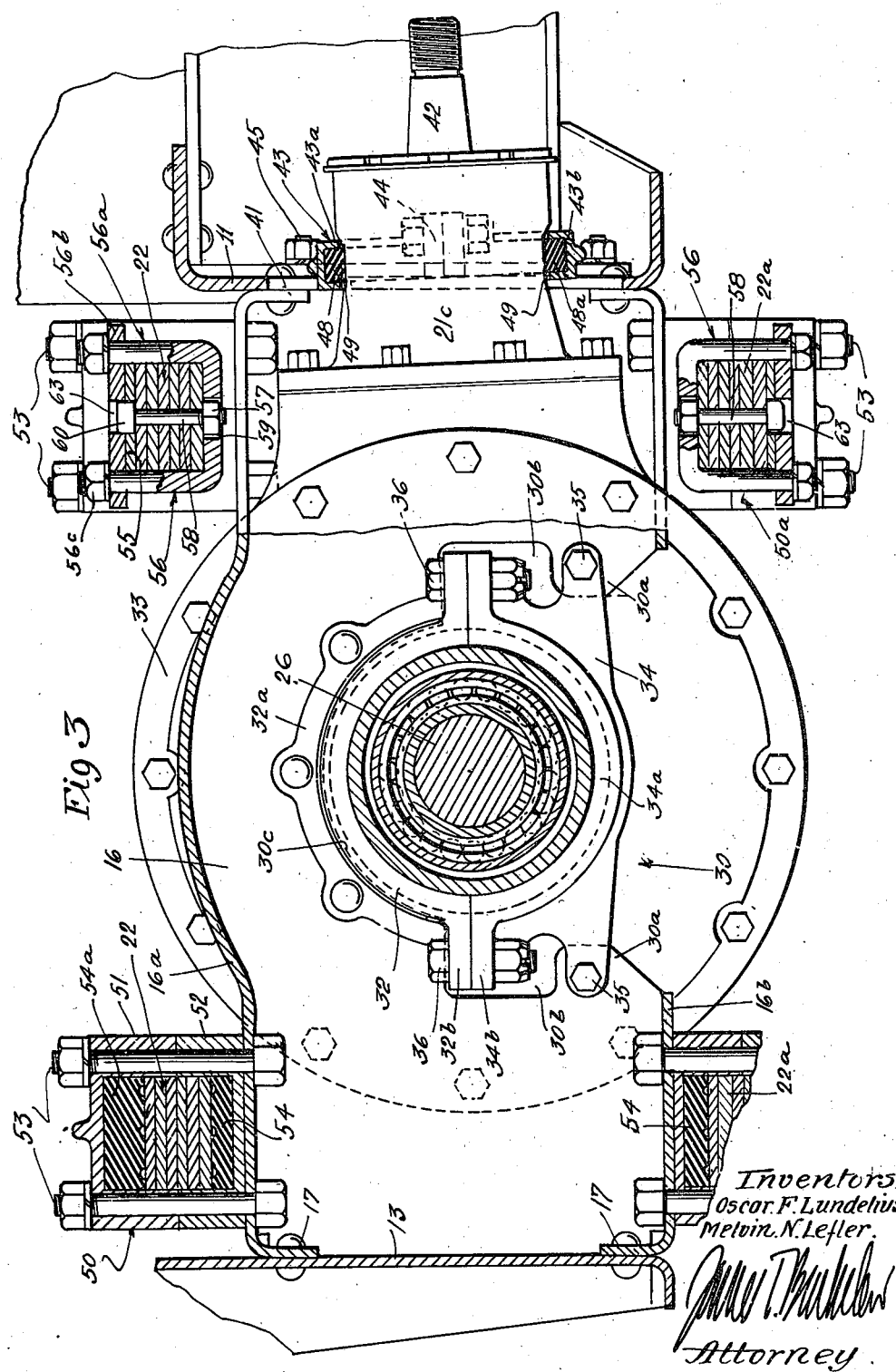

Dec. 24, 1935.  O. F. LUNDELIUS ET AL  2,025,668
VEHICLE DIFFERENTIAL MOUNTING
Filed Aug. 7, 1933  3 Sheets-Sheet 3
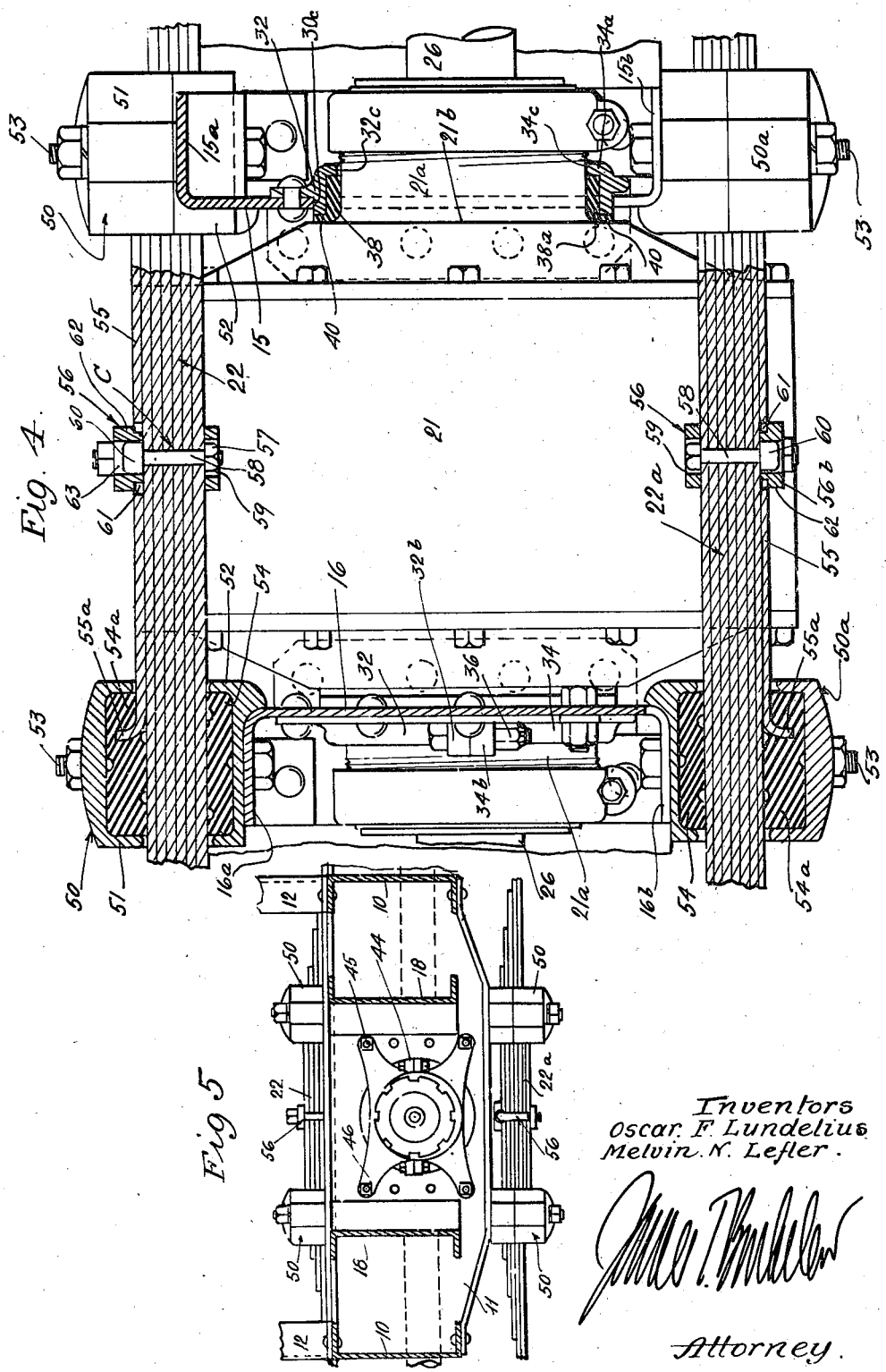
Inventors
Oscar F. Lundelius
Melvin N. Lefler.
Attorney.

Patented Dec. 24, 1935

2,025,668

UNITED STATES PATENT OFFICE 2,025,668

VEHICLE DIFFERENTIAL MOUNTING

Oscar F. Lundelius and Melvin N. Lefler, Los Angeles, Calif., assignors to Lundelius & Eccleston Motors Corporation, Los Angeles, Calif., a corporation of Delaware Application August 7, 1933, Serial No. 683,929

5 Claims. (Cl. 180—70)

This invention deals generally with improvements in differential and rear spring mountings for vehicles, the more specific phases of the invention being directed to improvements of this character in vehicles of the complete spring supported type in which the wheels are carried at the ends of a transversely extending spring assembly. One of the major purposes of the invention is to provide improvements in the type of differential and spring mountings comprising the subject-matter of Patent No. 1,814,256, granted July 14, 1931, to Oscar F. Lundelius, et al., on Vehicle chassis.

In previous differential and rear spring assemblies, for example as shown in the patent referred to, the practice has been to mount the differential on the frame by means of rigid attachments, and to mount the springs either in steel clamps or rubber cushion retainers, depending on the type of spring mounting preferred. One of the undesirable characteristics of pre-existing differential mountings which it is proposed to overcome by the present invention, is their tendency to transmit excessive shocks and vibrations from the differential to the frame, due to the rigidity of the connections between the differential and frame. Certain of the broad novel features of the invention are covered in our copending application on Differential and spring mounting, Ser. No. 683,926, filed on even date herewith, and disclosing various forms of differential mountings embodying yieldable and/or sound deadening elements preferably in the form of rubber cushions, interposed between the differential and the frame. By incorporating the rubber cushions in the differential mountings, we avoid the above mentioned objectionable shock transmitting characteristics of differential mountings heretofore used, in that the rubber cushions largely absorb the shocks and vibrations imposed on the differential and minimize the extent of their transmission to the frame.

In accordance with the present invention, we mount the differential in rubber at opposite sides of its center, transversely of the frame, the preferred form of mounting comprising annular rubber cushions surrounding and engaging the hub portions of the differential. Additionally and preferably we also mount the forward or pinion housing portion of the differential casing in rubber for the purpose of cushioning the differential against oscillatory movement about its transverse axis.

The springs may be provided in any suitable number and arrangement, and the individual spring mountings may be of any approved type. We preferably, however, support the individual springs in mountings having some of the general characteristics of the mounting shown in Patent No. 1,810,319, granted July 16, 1931 to Oscar F. Lundelius et al., on Spring mounting; this form of mounting embodying a pair of spaced rubber lined boxes which clamp each spring at opposite sides of its longitudinal center.

While the invention has additional objects and features of importance, these as well as the above mentioned objects and characteristics will be understood to best advantage without further preliminary discussion, from the following detailed description of a typical and preferred form of the invention. Reference is had for purposes of description to the accompanying drawings, in which:

Fig. 3 is an enlarged section on broken line 3—3 of Fig. 1;

Fig. 4 is an enlarged transverse section on broken line 4—4 of Fig. 1; and

Fig. 5 is an enlarged front elevation as viewed from line 5—5 of Fig. 1.

Figure 1:
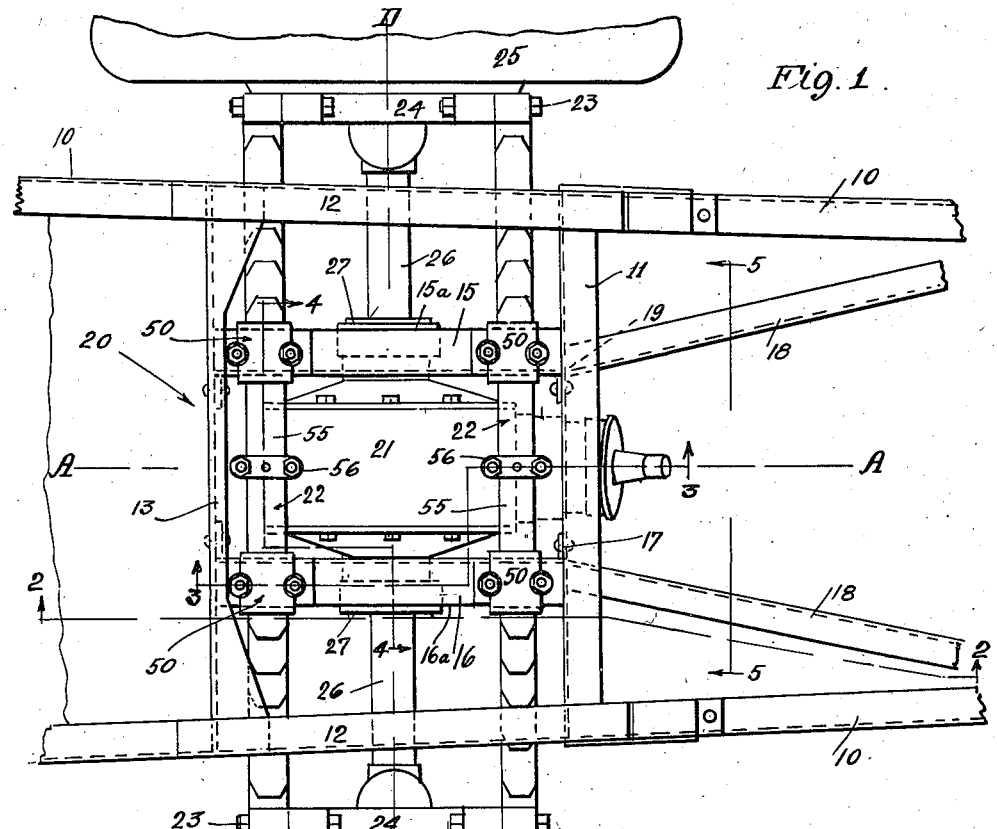
Figure 1 is a view showing the differential and rear spring assemblies in plan.
Figure 2:
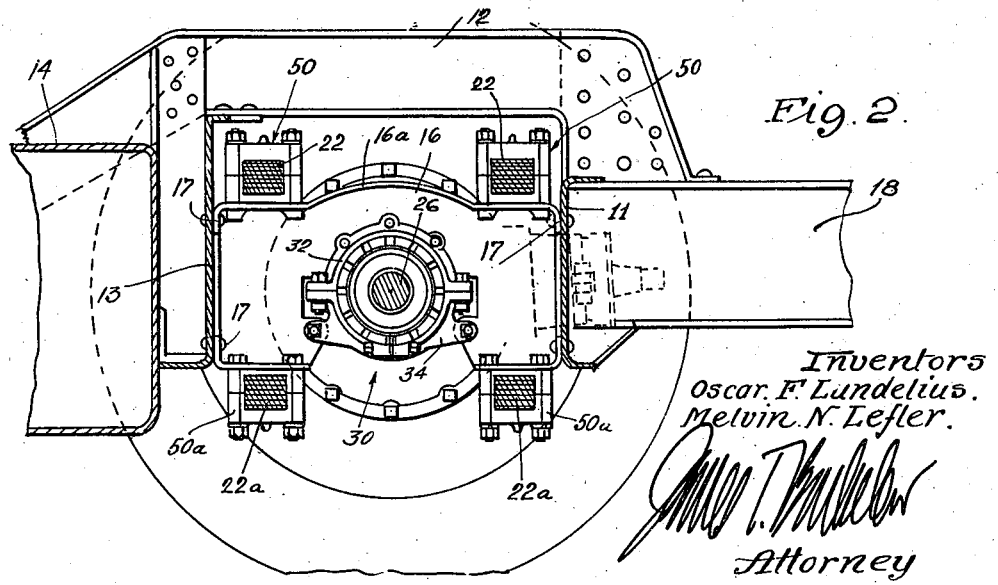
Fig. 2 is a side elevation on line 2—2 of Fig. 1.

The vehicle frame, in its preferred construction, comprises longitudinally extending side rails 10 interconnected by a forward transverse member 11. Kick up sills 12 form continuations of the end side rails 10 rearwardly of the frame from forward transverse member 11, and are vertically offset as shown in Fig. 2, to permit vertical flexure of the springs, hereinafter described. Kick up sills 12 are interconnected by rear transverse frame member 13 spaced a substantial distance from the forward transverse member 11. Gasoline tank 14 is carried on the frame at the rear of transverse member 13.

Longitudinally extending members 15 and 16, hereinafter termed subrails and comprising part of the frame, extend between and connect at 17 with transverse members 11 and 13, the subrails being spaced equally from the longitudinal axis A—A of the frame. The frame also includes longitudinally extending braces 18 connecting at 19 with transverse member 11 so as to constitute, in effect, continuations of subrails 15 and 16. Braces 18 diverge forwardly of the frame to points of connection, not shown, with side rails 10.

The differential and rear springs assembly, generally indicated at 20, comprises the differential 21 mounted on the subrails and forward transverse member, and two vertically spaced pairs of transverse springs 22, 22a mounted on the subrails at points offset toward the differential from transverse frame members 11 and 13, and arranged symmetrically with reference to the transverse axis D—D' of the differential. Spring ends are pivotally connected at 23 with wheel carriers 24 to which the wheels 25 are attached. The wheels are driven from the differential by way of flexible shafts 26 having universal joint connections, diagrammatically indicated at 27, which permit vertical oscillation of the shafts in accordance with vertical displacement of the wheels as road irregularities are encountered.

The subrails 15 and 16 have upper, outwardly projecting flange portions 15a, 16a, and lower flanges 15b, 16b, the central portions of the subrails between the last mentioned lower flanges being recessed from the bottom to provide openings 30 which receive the hub portions of the differential, as later described. As shown most clearly in Fig. 3, the differential receiving openings in the subrails are shaped to provide lugs 30a and recesses at 30b, the upper edge of the opening, indicated by dotted lines 30c, being substantially semicircular in shape.

The casing of the differential 21 has laterally projecting hub portions 21a which are supported within openings 30 in the subrails. A substantially semicircular ring segment 32 is inserted within the correspondingly shaped upper portion of each subrail opening 30, see Fig. 4, the outer flange portion 32a of the ring segment being attached by bolts or welds at 33 to the subrail. The lower portion of each opening 30 is bridged across by a plate 34 fastened to lugs 30a by bolts 35, the bridge piece having a semicircular flange portion 34a similar in cross sectional shape to the upper ring segment 32 which is riveted to the subrail. Bridge plate 34 and ring segment 32 are clamped together by bolts 36 passing through lugs 34b and 32b. It will be seen that the semicircular flanges 32 and 34a constitute a segmental ring extending around the hub portion 21a of the differential. Semicircular rubber cushions 38 and 38a are carried within the ring segments 32 and 34a, respectively, the rubber pieces being confined against outward expansion from between the ring and differential hub by flanges 32c and 34c having small clearance from the surfaces of the differential casing. The differential is cushioned against axial or transverse displacement by engagement with inner flanged portions 38a of the rubber cushions which project outwardly within space 40 between the rubber carrying ring and the differential casing annular shoulder 21b.

The forward portion 21c of the differential casing which forms the pinion housing, projects through an opening 41 in the forward transverse frame member 11, see Fig. 3. The pinion shaft 42 connects with the main drive shaft, not shown. A segmental ring 43, of channel cross section, is mounted on frame member 11, the ring surrounding the pinion housing and containing a rubber cushion element within which the forward portion of the differential is supported. Ring 43 comprises upper and lower semicircular sections 43a and 43b, see Fig. 5, held together by bolt clamps 44, the ring segments being attached to the front face of the transverse frame member 11 by bolts 45 passing through arms 46 formed integrally with the ring segments. The latter contain semicircular rubber cushions 48, 48a terminating at the joints between the ring segments, the cushion elements engaging the slightly recessed surface of the pinion housing 21c. Suitable clearance is provided at 49 between the surface of the pinion housing and the sides of the ring 43 to prevent metal to metal contact and to permit substantial compression of the rubber without such contact.

From the foregoing it will be seen that the rubber mountings surrounding the differential hub portions, cushion the differential against movement relative to the frame in all directions, the body of the cushions 38, 38a yieldably resisting relative movement of the differential vertically or longitudinally relative to the frame, and the flange portions 38a cushioning the differential against transverse relative movement. It is also important to observe that these cushions have another function additive to the property of yieldability, in that they form effective sound deadening elements between the differential and the frame. The forward pinion housing mounting effectively cushions the differential against any oscillatory movement about its axis, that might arise as a result of the reactions through the gear parts to the driving force transmitted from the main drive and pinion shafts.

The springs 22 and 22a are carried within mountings or spring taking boxes 50 and 50a attached to the upper and lower flanged surfaces of the subrails. Each individual spring mounting includes a pair of these spring taking boxes positioned at opposite sides of the longitudinal center of the spring. Each box comprises sections 51 and 52 clamped together and attached to the subrail flanges by a pair of bolts 53 at opposite sides of the spring, see the sectional view to the left in Fig. 3. Rubber pads 54 and 54a are contained within sections 51, 52 of spring mountings, the pads preferably being tightly compressed within the boxes into engagement with the upper and lower surfaces of the springs. One advantage of this type of mounting lies in the fact that the resilient rubber cushion elements permit the spring to have effective lengths of flexure from substantially its longitudinal center at C, thus gaining a highly efficient spring action.

The spaced mountings 50 for each spring are interconnected by resiliently flexible buffer plates 55 which lie flatly against the top and bottom surfaces of the upper and lower springs, respectively, the end portions 55a of the buffer plates being turned away from the springs and terminating within rubber cushions 54a. The longitudinal centers C of the springs are fastened to the buffer plates by clamps 56, each consisting of U-bolts 56a and strap 56b. The nut 57 of the spring center bolt 58 is received within hole 59 in the U-bolt, the head 60 of the center bolt projecting within a longitudinally extending slot 61 in the buffer plate. Head 60 of the spring center bolt 58 is also received within an opening 63 in the strap part 56b of the clamp, the latter having lugs 62 which project into slot 61 to engage opposite sides of the bolt head 60.

The described connection between the springs and buffer plates has been devised primarily for the purpose of permitting longitudinal adjustment of the springs within their mountings, which may be desirable for various reasons, as where due to dimensional inaccuracies in one of the springs, the distance from the center bolt to one end of the spring may be greater than the distance of the center bolt to the other end, so that it becomes necessary to shift the spring longitudinally to compensate for such variation in the spring dimensions. In making longitudinal adjustments of the springs, the nuts on bolts 53 of the spring boxes may be loosened to permit shifting of the spring within the mountings, and nuts 56c on the center clamp loosened to allow the spring bolt 58 to move longitudinally within buffer plate slot 61. After the spring has been adjusted longitudinally, clamp 56 having been moved longitudinally of the buffer plate with the spring, the nuts on the center clamp and spring boxes are tightened to clamp the spring securely in place.

The various details and advantages of the described type of spring mounting are more fully set out in our copending application entitled Vehicle spring mounting, Ser. No. 683,927 filed on even date herewith, which deals specifically with spring mountings of the form shown herein.

The character and arrangement of the differential and spring mountings are such that the differential may be conveniently removed from the chassis by comparatively few and simple operations. In order to remove the differential, universal joints 27 may first be broken to disconnect the differential from the drive shafts 26. Lower rear springs 22a is then disconnected from the frame, it only being necessary that this single spring be removed. The pinion housing mounting 43 may then be disconnected by breaking the connections at 44 between the ring segments and removing nuts 45 which connect arms 46 with the frame. Bridge plates 34 of the differential mountings are next disconnected by removing bolts 35 and 36 to permit the differential to drop within the openings 30 in the subrails. Ample clearance is provided between the pinion housing and the wall of opening 41 in the forward transverse frame member 11, and between the lower forward spring and rear transverse frame member 13, to allow the differential to be backed out of opening 41 and dropped from the frame.

We claim:

1. In a vehicle of the character described, the combination comprising a differential, a frame including a pair of spaced longitudinally extending side members each of which is recessed upwardly from the bottom and the recesses receiving side portions of said differential, a transverse member extending between said side members, means for detachably mounting the forward portion of said differential on said transverse member, and bridge members extending across said recesses below the differential and attached to said side members at opposite sides of the recess, said bridge members being removable to permit dropping the differential after the differential has been released from its mounting on said transverse member.

2. In a vehicle of the character described, the combination comprising a differential, a frame including a pair of spaced longitudinally extending side members each of which is recessed upwardly from the bottom and the recesses receiving side portions of said differential, a transverse member extending between said side members and having an opening receiving the forward portion of said differential, a bearing supporting the differential on said transverse member, said bearing being releasable from the differential to permit its withdrawal through said opening, and bridge members extending across said recesses below the differential and attached to said side members at opposite sides of the recess, said bridge members being removable to permit dropping the differential after the differential has been released from its mounting on said transverse member.

3. In a vehicle of the character described, the combination comprising a differential, a frame including a pair of spaced longitudinally extending side members each of which is recessed upwardly from the bottom and the recesses receiving side portions of said differential, a transverse member extending between said side members and having an opening receiving the forward portion of said differential, a bearing supporting the differential on said transverse member and including a segmental rubber annulus engaging the differential, said bearing being releasable from the differential to permit its withdrawal through said opening, and bridge members extending across said recesses below the differential and attached to said side members at opposite sides of the recess, said bridge members being removable to permit dropping the differential after the differential has been released from its mounting on said transverse member.

4. In a vehicle of the character described, the combination comprising a differential, a frame including a pair of spaced longitudinally extending side members each of which is recessed upwardly from the bottom and the recesses receiving side portions of said differential, a transverse member extending between said side members, means for detachably mounting the forward portion of said differential on said transverse member, and bridge members extending across said recesses below the differential and attached to said side members at opposite sides of the recess, and rubber cushions supporting the differential on said bridge members, said bridge members being removable to permit dropping the differential after the differential has been released from its mounting on said transverse member.

5. In a vehicle of the character described, the combination comprising a differential, a frame including a pair of spaced longitudinally extending side members each of which is recessed upwardly from the bottom and the recesses receiving side portions of said differential, a transverse member extending between said side members and having an opening receiving the forward portion of said differential, a bearing supporting the differential on said transverse member, said bearing being releasable from the differential to permit its withdrawal through said opening, bridge members extending across said recesses below the differential and attached to said side members at opposite sides of the recess, said bridge members being removable to permit dropping the differential after the differential has been released from its mounting on said transverse member, and rubber cushions included in said bearing and bridge members engaging and yieldably supporting the differential.

OSCAR F. LUNDELIUS.
MELVIN N. LEFLER.